United States Patent
Seita et al.

(10) Patent No.: US 10,866,365 B2
(45) Date of Patent: Dec. 15, 2020

(54) OPTICAL CONNECTOR

(71) Applicants: Japan Communication Accessories Manufacturing Co., Ltd., Komaki (JP); SUMITOMO ELECTRIC INDUSTRIES, LTD., Osaka (JP)

(72) Inventors: Mitsumasa Seita, Komaki (JP); Daizo Nishioka, Yokohama (JP)

(73) Assignees: JAPAN COMMUNICATION ACCESSORIES MANUFACTURING CO., LTD., Komaki (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/479,279

(22) PCT Filed: Dec. 21, 2017

(86) PCT No.: PCT/JP2017/046029
§ 371 (c)(1),
(2) Date: Jul. 19, 2019

(87) PCT Pub. No.: WO2018/135235
PCT Pub. Date: Jul. 26, 2018

(65) Prior Publication Data
US 2019/0384011 A1    Dec. 19, 2019

(30) Foreign Application Priority Data
Jan. 20, 2017    (JP) .................. 2017-008636

(51) Int. Cl.
*G02B 6/38* (2006.01)
*G02B 6/36* (2006.01)
*G02B 6/255* (2006.01)

(52) U.S. Cl.
CPC ......... *G02B 6/3801* (2013.01); *G02B 6/3616* (2013.01); *G02B 6/387* (2013.01); *G02B 6/2555* (2013.01)

(58) Field of Classification Search
CPC .... G02B 6/3801; G02B 6/3616; G02B 6/387; G02B 6/2555
See application file for complete search history.

(56) References Cited

U.S. PATENT DOCUMENTS

2005/0105872 A1*  5/2005  Saito ............... G02B 6/3636
                                                    385/134
2008/0107381 A1*  5/2008  Nishioka ........... G02B 6/3829
                                                    385/60

(Continued)

FOREIGN PATENT DOCUMENTS

CN    1628255 A    6/2005
CN    1969212 A    5/2007

(Continued)

*Primary Examiner* — Leslie C Pascal
(74) *Attorney, Agent, or Firm* — Faegre Drinker Biddle & Reath LLP

(57) ABSTRACT

An optical connector includes: a ferrule; a mechanical splice mechanically connecting an optical fiber to a shorter fiber; an optical fiber holder fixing the optical fiber in position; a joint member connecting the mechanical splice to the optical fiber holder; a housing accommodating the ferrule and the mechanical splice therein; a rear body accommodating at least a part of the optical fiber holder; and a coil spring urging the mechanical splice toward the front. The joint member is arranged in at least one of the housing and the rear body. The rear body has a guide wall to guide the optical fiber into the mechanical splice, and the guide wall is arranged between the mechanical splice and the optical fiber holder and has a tapered inner wall surface expanding from the mechanical splice toward the fiber holder.

12 Claims, 8 Drawing Sheets

(56) References Cited

U.S. PATENT DOCUMENTS

2011/0116745 A1    5/2011  Nishioka et al.
2011/0176780 A1*   7/2011  Barnes ................... G02B 6/245
                                                      385/78

FOREIGN PATENT DOCUMENTS

| JP | 2005-265975 A   | 9/2005  |
| JP | 2007-199741 A   | 8/2007  |
| JP | 2009-139837 A   | 6/2009  |
| JP | 4976145 A       | 4/2012  |
| WO | WO-2006/019161 A1 | 2/2006 |
| WO | WO 2010/132187 A2 | 11/2010 |

* cited by examiner

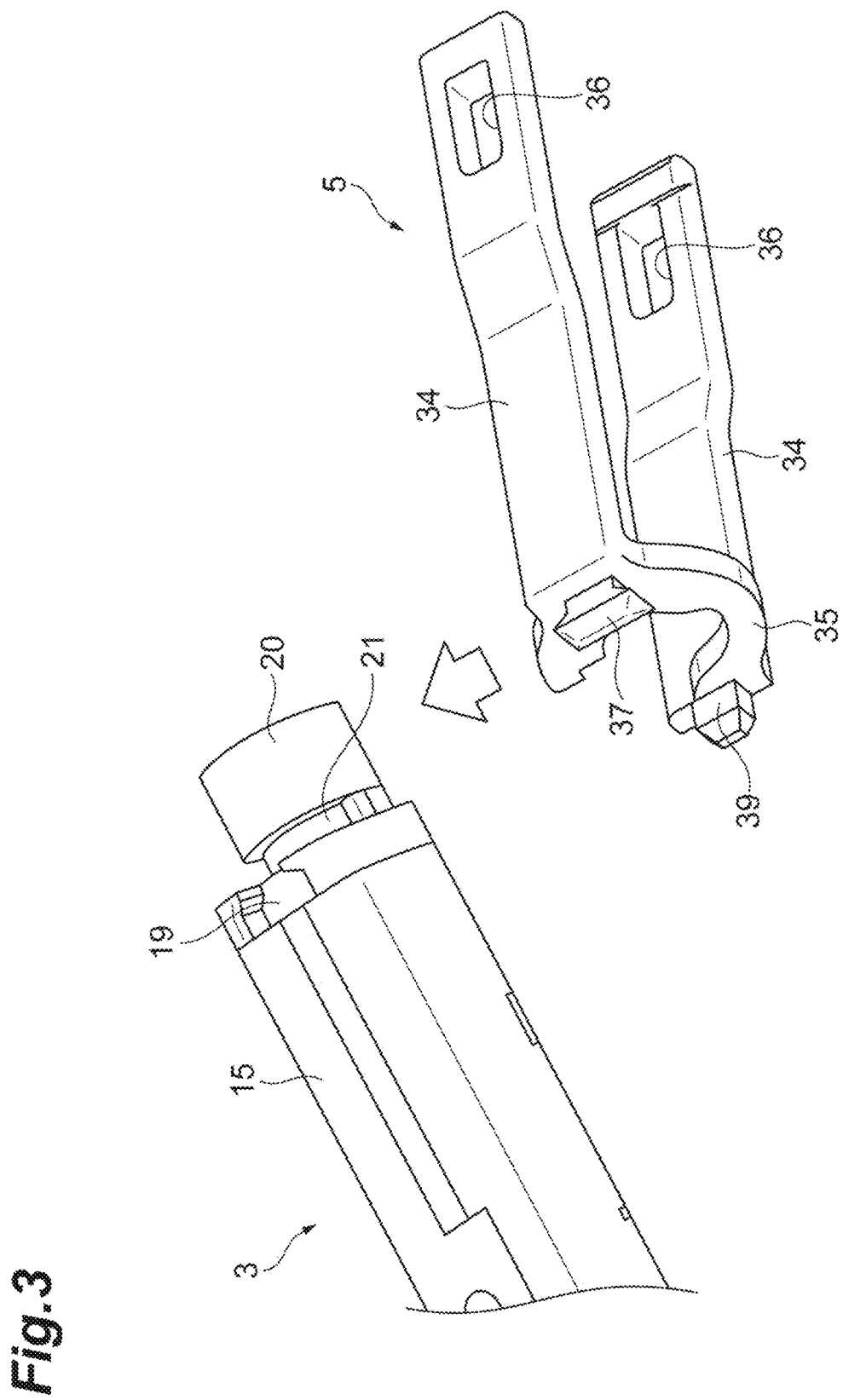

OPTICAL CONNECTOR

TECHNICAL FIELD

The present invention relates to an optical connector. The present application claims the benefit of Japanese Patent Application No. 2017-008636, filed on Jan. 20, 2017, which is hereby incorporated by reference in its entirety.

BACKGROUND ART

Patent Literature 1 discloses an example of the optical connector. The optical connector includes: a ferrule containing a shorter fiber; a mechanical splice mechanically fixing an optical fiber of an optical cable to the shorter fiber extending from the ferrule; an outer housing having a mechanical splice accommodating portion accommodating the mechanical splice; a jacket fixation portion accommodating a rear end portion of the outer housing and accommodating a jacket holder holding a cable jacket of the optical cable; a connection member connecting the mechanical splice to the jacket fixation portion; and a spring arranged on the outer side of the connection member and urging the mechanical splice toward the distal end via the connection member.

When assembling such an optical connector, in a state in which the mechanical splice is open, the optical fiber of the optical cable the cable jacket of which is held by the jacket holder is inserted into the mechanical splice from the rear of the connection member. When it is confirmed that the optical fiber has abutted the shorter fiber, the mechanical splice is placed in the closed state, and the shorter fiber and the fiber are mechanically fixed to each other.

CITATION LIST

Patent Literature

Patent Literature 1: International publication WO 2006/019161

SUMMARY OF INVENTION

An optical connector according to the present disclosure comprising: a ferrule internally containing a shorter fiber; a mechanical splice arranged at a rear of the ferrule, integrated with the ferrule, and mechanically connecting an optical fiber to the shorter fiber; an optical fiber holder arranged at the rear of the mechanical splice and fixing the optical fiber in position; a joint member connecting the mechanical splice to the optical fiber holder; a housing accommodating the ferrule and the mechanical splice therein; a rear body connected to the housing such that the rear body is arranged at a rear of the housing, the rear body accommodating at least a part of the optical fiber holder therein; and a coil spring arranged inside at least one of the housing and the rear body, the coil spring urging the mechanical splice toward a front. The joint member is arranged inside at least one of the housing and the rear body. The rear body has a guide wall to guide the optical fiber into the mechanical splice, and the guide wall is arranged between the mechanical splice and the optical fiber holder, and has a tapered inner wall surface expanding from the mechanical splice toward the optical fiber holder.

BRIEF DESCRIPTION OF DRAWINGS

FIG. 3 is an exploded perspective view of a mechanical splice and a joint member.

DESCRIPTION OF EMBODIMENTS

Figure 1:
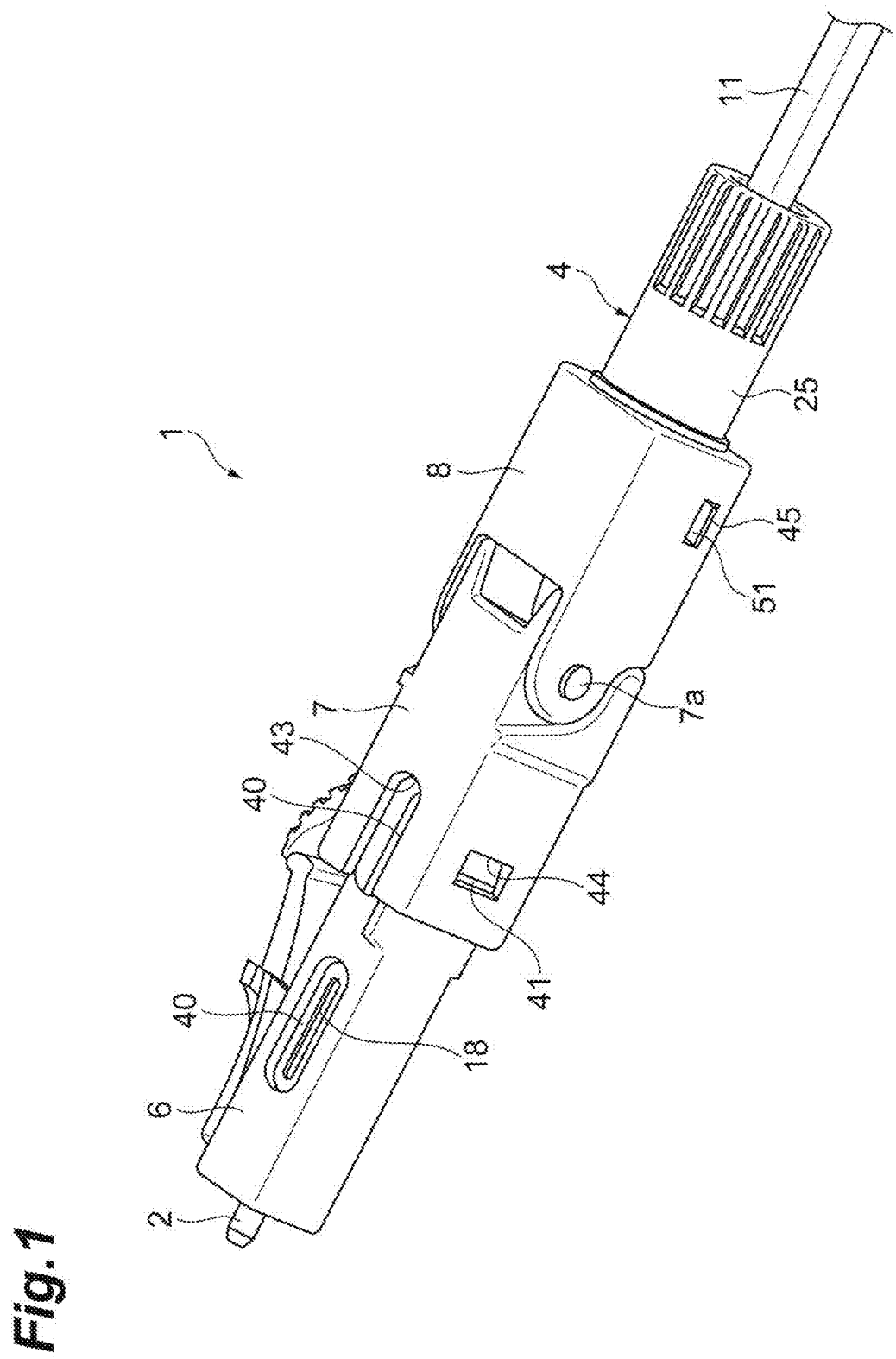
FIG. 1 is an external perspective view of an optical connector according to an embodiment.

Problem to Be Solved by the Present Disclosure

Taking into consideration the workability at the time of the assembly of the optical connector, it is desirable for the optical fiber to be capable of being smoothly inserted into the mechanical splice. In the optical connector of Patent Literature 1, the connection member is provided with the tapered portion expanding toward the rear (toward the jacket fixation portion), whereby the optical fiber can be easily inserted into the mechanical splice. In this case, however, the wall thickness of the portion of the connection member near the connection portion to the mechanical splice cannot but be rather large, resulting in an increase in the diameter of the connection member. As a result, a reduction in the size of the optical connector is prevented.

Advantageous Effect of Present Disclosure

According to the present disclosure, it is possible to smoothly insert the optical fiber into the mechanical splice while achieving a reduction in the size of the optical connector.

Description of Embodiments

Embodiments of the present invention will be described in order.

An optical connector according to an aspect of the present invention includes: a ferrule internally containing a shorter fiber; a mechanical splice arranged at the rear of the ferrule, integrated with the ferrule, and mechanically connecting an optical fiber to the shorter fiber; an optical fiber holder arranged at the rear of the mechanical splice and fixing the fiber in position; a joint member connecting the mechanical splice to the optical fiber holder; a housing accommodating the ferrule and the mechanical splice therein; a rear body connected to the housing such that the rear body is arranged at the rear of the housing, the rear body accommodating at least a part of the optical fiber holder therein; and a coil spring arranged inside at least one of the housing and the rear body, the coil spring urging the mechanical splice toward a front. The joint member is arranged inside at least one of the housing and the rear body. The rear body has a guide wall to guide the optical fiber into the mechanical splice, and the guide wall is arranged between the mechanical splice and the optical fiber holder, and has a tapered inner wall surface expanding from the mechanical splice toward the optical fiber holder.

When the optical fiber fixed to the optical fiber holder is connected to the shorter fiber in such an optical connector, the optical fiber is inserted into the mechanical splice from the guide wall of the rear body. The guide wall has the tapered inner wall surface expanding from the mechanical splice toward the optical fiber holder. According to this configuration, the optical fiber can be smoothly inserted into the mechanical splice. Further, the guide wall is provided on the rear body, so that there is no need to provide the joint member connecting the mechanical splice and the optical fiber holder with the guide wall having the tapered inner wall surface. Thus, it is possible to reduce the wall thickness of the portion of the joint member near the connecting portion to the mechanical splice, so that it is possible to reduce the external dimension of at least one of the housing and the rear body. Therefore, it is possible to achieve a reduction in the size of the optical connector.

The guide wall may be arranged on the inner of the joint member. The guide wall may be arranged such that the guide wall is spaced away from the rear end of the mechanical splice. The guide wall may or may not have the inner wall surface of a fixed inner diameter close to the mechanical splice.

The coil spring may be arranged on the inner of the joint member. In such a structure, as compared with the case where the coil spring is arranged on the outer of the joint member, it is possible to further reduce the external dimension of at least one of the housing and the rear body by the dimension of the coil spring. Thus, it is possible to achieve a further reduction in the size of the optical connector.

A recess or a protrusion may be provided at the rear portion of the mechanical splice, and there may be provided a protrusion fit-engaged with the recess of the mechanical splice or a recess fit-engaged with the protrusion of the mechanical splice at the front portion of the joint member. The joint member may have a pair of arms connected to the optical fiber holder, and a retaining portion provided so as to connect the pair of arms each other and retaining the mechanical splice by pinching the mechanical splice. At the front end portion of one of the pair of arms, there may be provided a protrusion fit-engaged with the recess or a recess fit-engaged with the protrusion. In such a structure, it is possible, for example, to easily connect the joint member to the rear portion of the mechanical splice, making it possible to easily assemble the optical connector. Further, due to the retaining portion, the protrusion, and recess, the joint member is firmly connected to the mechanical splice, so that the joint member is not easily detached from the mechanical splice. Thus, it is possible to improve the handling property of the mechanical splice and the joint member when assembling the optical connector.

At the rear end portion of the housing, there may be provided a cutout or a protrusion, and, at the front end portion of the other of the pair of arms, there may be provided a protrusion engaged with the cutout or a cutout engaged with the protrusion of the housing. In this structure, the protrusion is engaged with the cutout, whereby the joint member is set in position with respect to the housing.

At the rear portion of the pair of arms, there may be provided an opening or a protrusion, and the pair of arms may be connected to the optical fiber holder by the opening or the protrusion. Each of the pair of arms may have a first plate, a second plate located closer to the optical fiber holder than the first plate, and an inclined portion located between the first plate and the second plate. The inclined portion may have a shape outwardly inclined toward the optical fiber holder, with the distance between the second plates being larger than the distance between the first plates. The joint member may be set in position such that at least one of the inclined portion and the second plate is located outside of the tapered inner wall surface of the guide wall.

The joint member may be configured to be connected to the mechanical splice through the engagement of the retaining portion with a retaining groove provided at the rear portion of the mechanical splice. The retaining portion may be C-shaped.

The mechanical splice may have a base member having a fiber groove setting the optical fiber and the shorter fiber in position, and a pressing member pressing the optical fiber and the shorter fiber against the base member. The base member may be integrated with the ferrule, and a recess or a protrusion for connection with the joint member may be provided at the rear portion of the base member. In this structure, the recess or the protrusion is provided at the rear portion of the base member integrated with the ferrule, so that the state of connection between the mechanical splice and the joint member is stabilized.

Detailed Description of Embodiments of Invention

In the following, embodiments of the present invention will be described in detail with reference to the drawings. The present invention is not limited to these examples. The present invention is indicated by the claims and is intended to include all changes within meanings and a scope equivalent to the claims. In the following description, the same components in the drawings are designated by the same reference numerals, and a redundant description will be left out.

Figure 2:
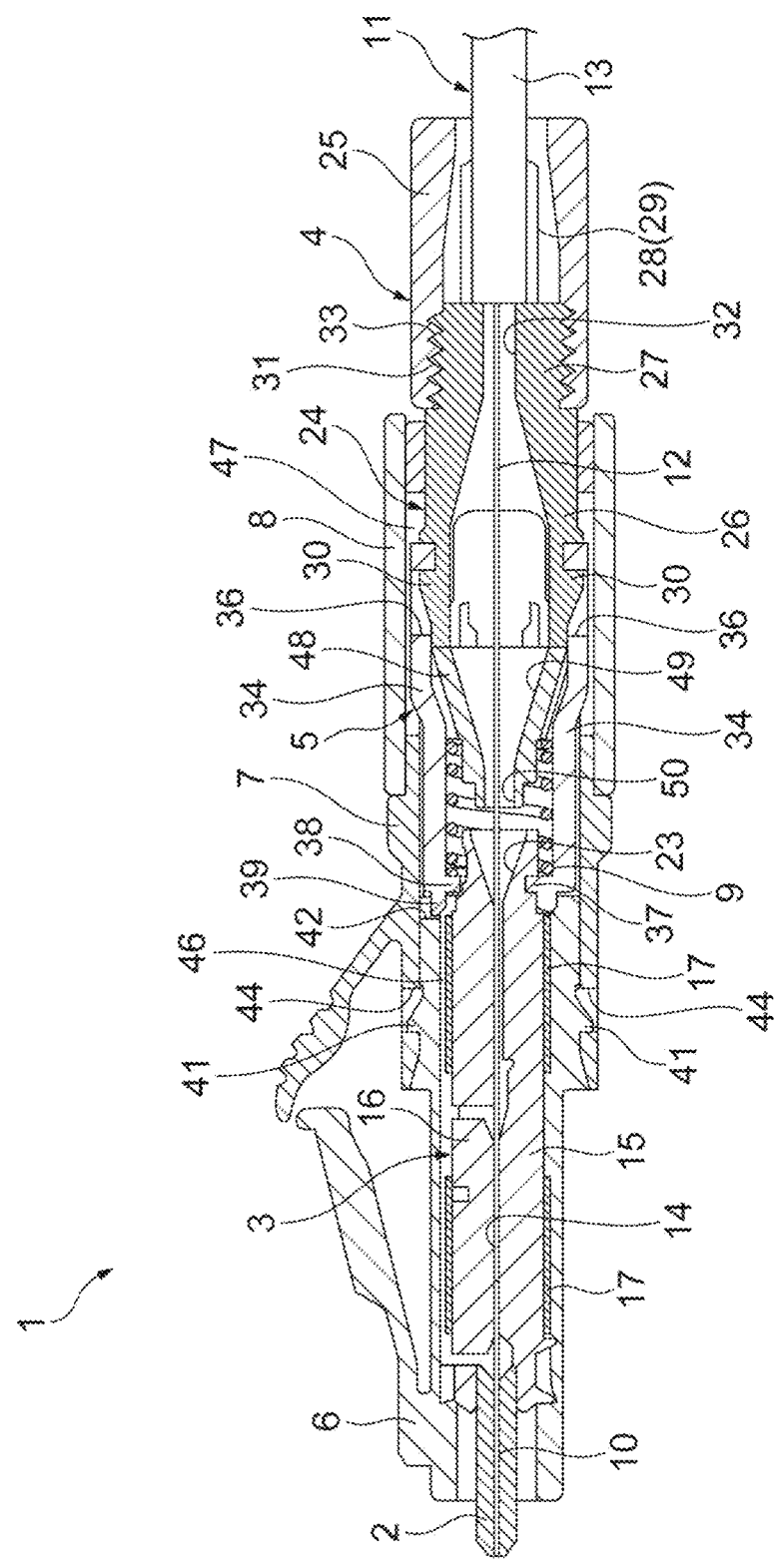
FIG. 2 is a sectional view of the optical connector shown in FIG. 1.

FIG. 1 is an external perspective view of an optical connector according to an embodiment of the present invention. FIG. 2 is a sectional view of the optical connector shown in FIG. 1. In FIGS. 1 and 2, an optical connector 1 according to the present embodiment is of the type which is referred to as an LC connector. The optical connector 1 comprises a ferrule 2, a mechanical splice 3, an optical fiber holder 4, a joint member 5, a plug housing 6, a rear body 7, a cover housing 8, and a coil spring 9.

The ferrule 2 has a columnar shape. The front end surface of the ferrule 2 is an optical connection surface optically connected with another optical connector. A shorter fiber 10 is previously contained in the ferrule 2 internally. The shorter fiber 10 is fixed to the ferrule 2 by adhesive or the like. The shorter fiber 10 extends backwards (e.g., to the right in FIG. 2) from the rear end surface of the ferrule 2.

The mechanical splice 3 is arranged at the rear of the ferrule 2. The mechanical splice 3 is integrated with the ferrule 2 by adhesive or the like. The mechanical splice 3 is an optical connector which mechanically connects a fiber 12 of an optical cable 11 to the shorter fiber 10 internally contained in the ferrule 2, and which can be opened and closed. The optical cable 11 has a structure in which the optical fiber 12 is covered with a cable jacket 13.

The mechanical splice 3 has a base member 15 having a fiber groove 14 of a V-shaped sectional configuration setting the optical fiber 12 and the shorter fiber 10 in position, a pressing member 16 pressing the optical fiber 12 and the shorter fiber 10 accommodated in the fiber groove 14 against the base member 15, and a plurality of clamp springs 17 of a U-shaped sectional configuration holding the base member 15 and the pressing member 16 between them. The base member 15 is integrated with the ferrule 2. At the boundary portion of the mechanical splice 3 between the base member 15 and the pressing member 16, there are formed a plurality of recesses 18 for wedge insertion. When a wedge (not shown) is inserted into a recess 18, the base member 15 and the pressing member 16 are placed in an open state against the urging force of the clamp spring 17.

As shown in FIG. 3, at the rear portion of the base member 15, there is provided a recess 19 for connection. At the rear end portion of the base member 15, there is provided a substantially half-cylindrical protrusion 20. The protrusion 20 is provided with a half-ring-like retaining groove 21. As shown in FIG. 4B, at the rear end portion of the pressing member 16, there is provided a substantially half-cylindrical protrusion 22 so as to be opposite the protrusion 20.

Figure 5:
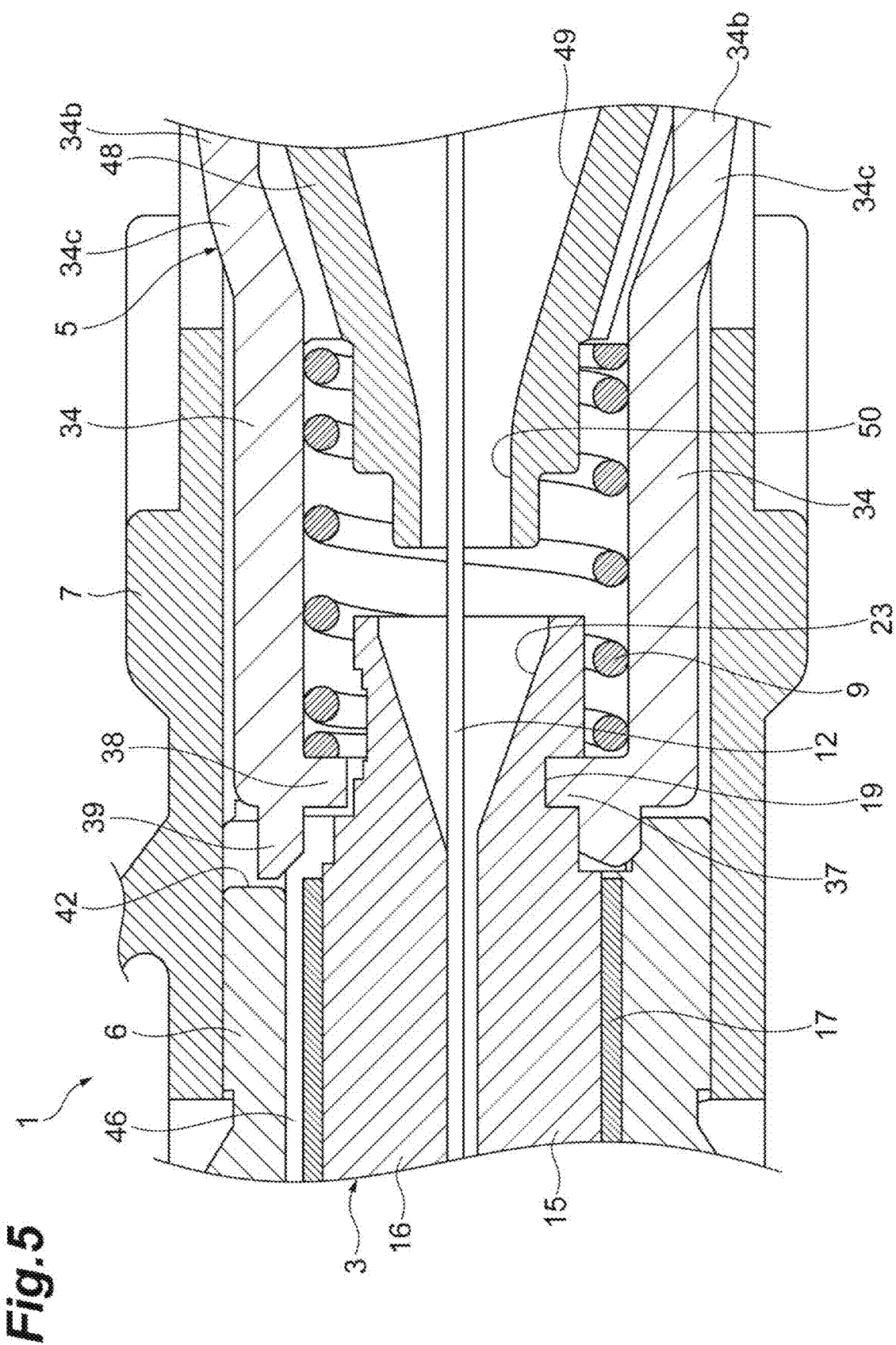
FIG. 5 is an enlarged sectional view of a region including a coil spring in FIG. 2.

As shown also in FIG. 5, at the rear end portion of the mechanical splice 3, there is provided a tapered inner wall surface 23 increased in diameter toward the rear of the mechanical splice 3. It is easier to insert the optical fiber 12 into the mechanical splice 3 by this configuration.

Figure 6:
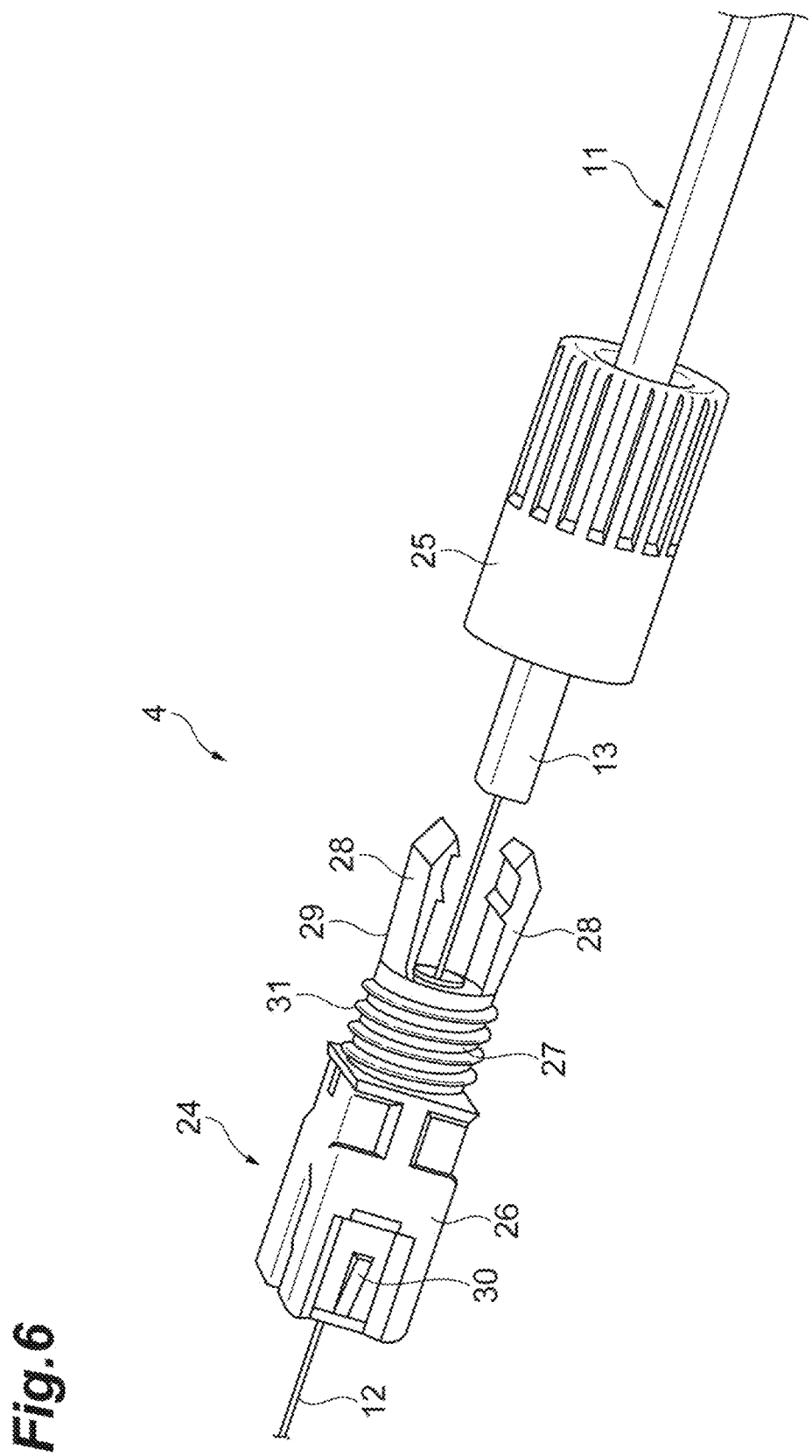
FIG. 6 is an exploded perspective view of an optical fiber holder shown in FIG. 2.

The optical fiber holder 4 is arranged at the rear of the mechanical splice 3, and fixes the optical cable 11 in position, thereby fixing the optical fiber 12 in position. As shown in FIG. 6, the optical fiber holder 4 has a holder main body 24 and a cap 25.

The holder main body 24 has a base 26, a tubular portion 27 protruding from the rear end (distal end) of the base 26, and a grasping portion 29 consisting of a pair of arms 28 provided so as to extend rearwards from the rear end (distal end) of the tubular portion 27. The base 26 is provided with a pair of protrusions 30 for connection. A male screw 31 is formed on the outer peripheral surface of the tubular portion 27. The grasping portion 29 grasps the cable jacket 13 of the optical cable 11 by the pair of arms 28. The holder main body 24 is provided with a hole 32 which extends through the tubular portion 27 and the base 26 and into which the optical fiber 12 exposed through removal of the cable jacket 13 is inserted (See FIG. 2).

The cap 25 has a substantially cylindrical shape. In the inner peripheral surface of the front of the cap 25, there is formed a female screw 33 to be threadedly engaged with the male screw 31 (See FIG. 2).

When fixing the optical cable 11 in position by the optical fiber holder 4, in the state in which the optical cable 11 is inserted into the cap 25, the exposed optical fiber 12 is inserted into the hole 32 of the holder main body 24. When the end of the cable jacket 13 abuts the rear end surface of the tubular portion 27, the cap 25 is screwed into the tubular portion 27. Then, the arms 28 of the grasping portion 29 undergo elastic deformation so as to sandwich the cable jacket 13. Thus, the cable jacket 13 is grasped by the grasping portion 29.

The joint member 5 connects the mechanical splice 3 to the optical fiber holder 4. As shown in FIG. 3, the joint member 5 has a pair of arms 34 connected to the optical fiber holder 4, and a substantially C-shaped retaining portion 35 provided so as to connect the front portions of the pair of arms 34 and retaining the mechanical splice 3 by pinching the mechanical splice 3.

The antis 34 have a plate-like shape. Each arm 34 is provided with an opening 36 for connection engaged with the protrusion 30 of the holder main body 24. The protrusion 30 is caught by the opening 36, whereby the joint member 5 and the optical fiber holder 4 are connected to each other. The opening for connection may be provided in the holder main body 24, and the protrusion for connection may be provided on the arms 34. Each arm 34 has a first plate 34a, a second plate 34b located closer to the optical fiber holder 4 than the first plate 34a, and an inclined portion 34c located between the first plate 34a and the second plate 34b. The inclined portion 34c has a shape outwardly inclined toward the optical fiber holder 4, and is configured so that the distance between the second plates 34b is larger than the distance between the first plates 34a. The openings 36 are provided, for example, in the second plates 34b.

At the front end portion of one of the pair of arms 34, there is provided a protrusion 37 for connection fit-engaged with the recess 19 of the base member 15. The protrusion for connection may be provided at the rear portion of the base member 15, and the recess for connection to be fit-engaged with the protrusion for connection may be provided at the front end portion of the arm 34. At the front end portion of the other of the pair of arms 34, there are provided a support protrusion 38 abutting the pressing member 16 and a protrusion 39 for positioning engaged with a cutout 42 (described below) of the plug housing 6.

Figure 4A:
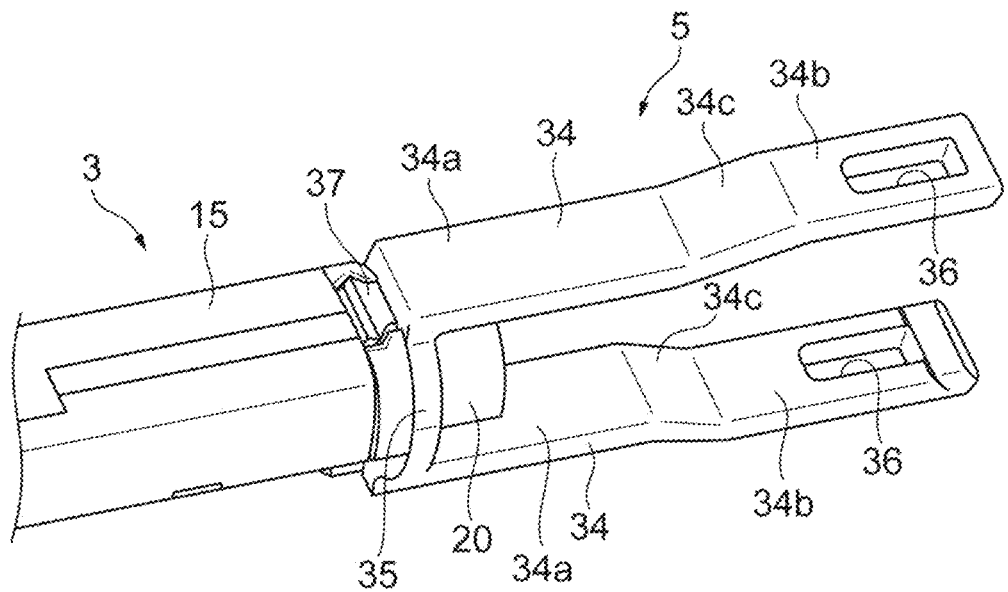
FIG. 4A is a perspective view illustrating a state in which the joint member is connected to the mechanical splice.
Figure 4B:
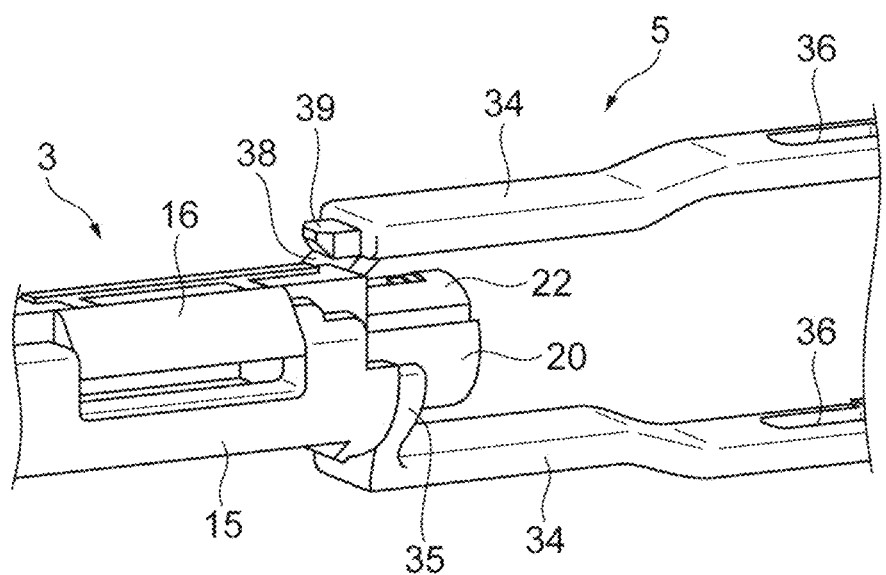
FIG. 4B is another perspective view illustrating a state in which the joint member is connected to the mechanical splice.

As shown in FIGS. 4A and 4B, the retaining portion 35 is engaged with the retaining groove 21 of the base member 15. When the retaining portion 35 undergoes elastic deformation and is fit-engaged with the retaining groove 21, the protrusion 37 is caught by the recess 19, and the support protrusion 38 abuts the protrusion 22 of the pressing member 16. The joint member 5 and the mechanical splice 3 are connected together in a state in which they are firmly fit-engaged with each other by this configuration.

The plug housing 6 accommodates the ferrule 2 and the mechanical splice 3. The plug housing 6 has a rectangular shape in front view. The front end portion of the ferrule 2 protrudes from the front end of the plug housing 6. At the position of the plug housing 6 corresponding to the recess 18 for wedge insertion of the mechanical splice 3, there is provided a window 40 exposing the recess 18. At the rear portion of the plug housing 6, there are provided a pair of protrusions 41 for connection.

As shown also in FIG. 5, at the rear end portion of the plug housing 6, there is provided a cutout 42 for performing positioning between the joint member 5 and the plug housing 6. The protrusion 39 for positioning for the joint member 5 enters the cutout 42, whereby the joint member 5 is set in position with respect to the plug housing 6. The protrusion for positioning may be provided at the rear end portion of the plug housing 6, and the cutout to be engaged with the protrusion for positioning may be provided at the front end portion of the arm 34.

The rear body 7 is connected to the plug housing 6 such that the rear body 7 is arranged at the rear of the plug housing 6. The rear body 7 accommodates the optical fiber holder 4 and the joint member 5. The rear body 7 has a rectangular shape in front view.

At the front portion of the rear body 7, there is provided a cutout 43 exposing one recess 18 for wedge insertion in cooperation with the window 40 of the plug housing 6. At the front portion of the rear body 7, there is provided a pair of openings 44 for connection engaged with the protrusion 41 of the plug housing 6. Each protrusion 41 is caught by each opening 44, whereby the plug housing 6 and the rear body 7 are connected to each other. The opening for connection may be provided at the rear portion of the plug housing 6, and the protrusion for connection may be provided at the front portion of the rear body 7. At the center of the rear body 7, there protrude a pair of shaft portions 7a. At the rear portion of the rear body 7, there are provided a pair of protrusions 45 for locking.

In the front portion of the rear body 7, there is arranged a front accommodation region 46 accommodating the mechanical splice 3 and the rear portion of the plug housing 6 along with the front portion of the joint member 5. In the rear portion of the rear body 7, there is arranged a rear accommodation region 47 accommodating the rear portion of the joint member 5 and the holder main body 24 of the optical fiber holder 4.

Between the front accommodation region 46 and the rear accommodation region 47 of the rear body 7, there is provided a guide wall 48 for guiding the exposed optical fiber 12 into the mechanical splice 3. That is, the guide wall 48 is arranged between the mechanical splice 3 and the optical fiber holder 4. The guide wall 48 is arranged such that the guide wall 48 is spaced away from the rear end of the mechanical splice 3. The guide wall 48 is arranged on the inner side of the joint member 5.

As shown also in FIG. 5, the guide wall 48 has a tapered inner wall surface 49 increased in diameter from the mechanical splice 3 toward the optical fiber holder 4. The inner diameter of the inner wall surface 49 gradually increases from the mechanical splice 3 toward the optical fiber holder 4. On the front end of the inner wall surface 49 of the guide wall 48, there is provided an inner wall surface 50 of a fixed inner diameter. The guide wall 48 and the joint member 5 are set in position such that the inclined portion 34c and the second plate 34b of the arm 34 of the joint member 5 are located outside the tapered inner wall surface 49 of the guide wall 48.

While in the above example the joint member 5 is arranged inside the rear body 7, this should not be construed restrictively. The joint member 5 may be arranged inside the plug housing 6, or may be arranged astride both interiors of the rear body 7 and of the plug housing 6.

The cover housing 8 covers the holder main body 24 of the optical fiber holder 4. The cover housing 8 is rotatably attached to the rear body 7 (so as to be capable of opening and closing) via the shaft portion 7a. The cover housing 8 is provided with a pair of openings 51 for locking to be engaged with the respective protrusions 45 of the rear body 7. When the cover housing 8 is closed, each protrusion 45 is caught by each opening 51, whereby the cover housing 8 is locked to the rear body 7. The protrusion for locking may be provided on the cover housing 8, and the opening for locking may be provided in the rear body 7.

As shown in also FIG. 5, the coil spring 9 is arranged inside the joint member 5 in the rear body 7 and outside the guide wall 48. The inner of the joint member 5 corresponds to the axis of the ferrule 2 of the joint member 5. Specifically, the coil spring 9 is arranged between the joint member 5 and the mechanical splice 3 and the guide wall 48. The coil spring 9 urges the mechanical splice 3 toward the front. One end (front end) of the coil spring 9 abuts the support protrusion 38 of the joint member 5, and the other end (rear end) of the coil spring 9 abuts the vertical wall surface of the guide wall 48.

While in the above example the coil spring 9 is arranged inside the rear body 7, this should not be construed restrictively. The coil spring 9 may be arranged inside the plug housing 6, or astride the interiors of the rear body 7 and of the plug housing 6.

A method of connecting the optical fiber 12 of the optical cable 11 fixed to the optical fiber holder 4 to the shorter fiber 10 internally contained in the ferrule 2 when assembling the optical connector 1 will be described. The wedge is inserted into the recess 18 for wedge insertion of the mechanical splice 3, and the base member 15 and the pressing member 16 are opened against the urging force of the clamp spring 17. In this open state, the optical fiber 12 is passed into the inner space of the inner wall surfaces 49 and 50 of the guide wall 48 and is inserted into the mechanical splice 3. Then, the optical fiber 12 and the shorter fiber 10 are caused to abut each other, and then wedge is pulled out of the recess 18, whereby the base member 15 and the pressing member 16 are closed by the urging force of the clamp spring 17. Thus, the optical fiber 12 and the shorter fiber 10 are mechanically connected to each other by the mechanical splice 3.

In the present embodiment described above, when connecting the optical fiber 12 to the shorter fiber 10, the optical fiber 12 is inserted into the mechanical splice 3 from the guide wall 48 of the rear body 7. The guide wall 48 has the tapered inner wall surface 49 increasing in diameter from the mechanical splice 3 toward the optical fiber holder 4. Thus, it is possible to smoothly insert the optical fiber 12 into the mechanical splice 3. Further, the guide wall 48 is provided on the rear body 7, so that there is no need to provide a guide wall having a tapered inner wall surface on the joint member 5 connecting the mechanical splice 3 to the optical fiber holder 4. Thus, it is possible to diminish the wall thickness of the portion of the joint member 5 near the connection portion for the connection with the mechanical splice 3. That is, the outer wall surface of the guide wall 48 can also be a tapered surface increased in outer diameter from the mechanical splice 3 toward the optical fiber holder 4. The joint member 5 is arranged outside the mechanical splice 3, so that the influence of the wall thickness of the joint member 5 on the external dimension of the rear body 7 is great. On the other hand, the guide wall 48 is arranged at the rear of the mechanical splice 3, so that there is scarcely any influence of the wall thickness of the guide wall 48 on the external dimension of the rear body 7. Thus, as stated above, it is possible to diminish the wall thickness of the joint member 5, so that it is possible to diminish the external dimension of the rear body 7. Therefore, it is possible to achieve a reduction in the size of the optical connector 1.

In the case where the joint member 5 is arranged inside the plug housing 6, it is possible to diminish the external dimension of the plug housing 6. When the joint member 5 is arranged astride the interiors of the rear body 7 and of the plug housing 6, it is possible to diminish the external dimension of the rear body 7 and the plug housing 6.

In the present embodiment, the coil spring 9 is arranged inside the joint member 5 and outside the guide wall 48. As compared with the case where the coil spring 9 is arranged outside the joint member 5, in this structure, it is possible to further diminish the external dimension of the rear body 7 by the dimension of the coil spring 9. Thus, it is possible to achieve a further reduction in the size of the optical connector 1.

When the coil spring 9 is arranged inside the plug housing 6, it is possible to further diminish the external dimension of the plug housing 6 by the dimension of the coil spring 9. When the coil spring 9 is arranged astride the interiors of the rear body 7 and of the plug housing 6, it is possible to further diminish the external dimension of the rear body 7 and of the plug housing 6 by the dimension of the coil spring 9.

In the present embodiment, at the rear portion of the mechanical splice 3, there is provided the recess 19 for connection, and, at the front end portion of one arm 34 of the joint member 5, there is provided the protrusion 37 for connection to be fit-engaged with the recess 19. In this structure, it is possible to easily connect the joint member 5 to the rear portion of the mechanical splice 3, making it possible to easily assemble the optical connector 1. Further, due to the retaining portion 35, the protrusion 37, and the recess 19, the joint member 5 is firmly connected to the mechanical splice 3, so that the joint member 5 is not easily detached from the mechanical splice 3. Thus, at the time of assembly of the optical connector 1, it is possible to improve the handling property of the mechanical splice 3 and the joint member 5.

When the protrusion for connection is provided at the rear portion of the mechanical splice 3 and the recess for connection is provided at the front end portion of the arm 34, the joint member 5 is firmly connected to the mechanical splice 3 due to the retaining portion 35, the protrusion for connection and the recess for connection, so that the joint member 5 is not easily detached from the mechanical splice 3.

When the recess 19 is provided at the rear portion of the mechanical splice 3 and the protrusion 37 to be fit-engaged with the recess 19 is provided at the front end portion of one arm 34 of the joint member 5, as compared with the configuration where the protrusion for connection is provided on the mechanical splice 3 and where the opening for connection to be engaged with the protrusion is provided in the joint member 5, the wall thickness of the connection portion of the joint member 5 to be connected with the mechanical splice 3 is diminished, so that it is possible to further diminish the external dimension of the rear body 7. Thus, it is possible to achieve a further reduction in the size of the optical connector 1.

In the present embodiment, at the rear end portion of the plug housing 6, there is provided the cutout 42, and, at the front end portion of the other arm 34 of the joint member 5, there is provided the protrusion 39 for positioning to be engaged with the cutout 42. In this structure, the protrusion 39 is engaged with the cutout 42, whereby the joint member 5 is set in position with respect to the plug housing 6.

When the protrusion for positioning is provided at the rear end portion of the plug housing 6 and the cutout is provided at the front end portion of the arm 34, the protrusion for positioning is engaged with the cutout, whereby the joint member 5 is to be set in position with respect to the plug housing 6.

In the present embodiment, the recess 19 is provided at the rear portion of the base member 15 integrated with the ferrule 2, so that the connection state between the mechanical splice 3 and the joint member 5 is stabilized. This also applies to the case where the protrusion for connection is provided at the rear portion of the base member 15.

In the present embodiment, the support protrusion 38 solely abuts the mechanical splice 3 and is not connected thereto, so that the base member 15 and the pressing member 16 of the mechanical splice 3 can be easily opened.

In the present embodiment, the optical cable 11 in which the optical fiber 12 is covered with the cable jacket 13 is fixed in position by the fiber holder 4. It is, however, also possible for the optical fiber holder 4 to fix, for example, the optical fiber 12 itself in position.

Figure 7:
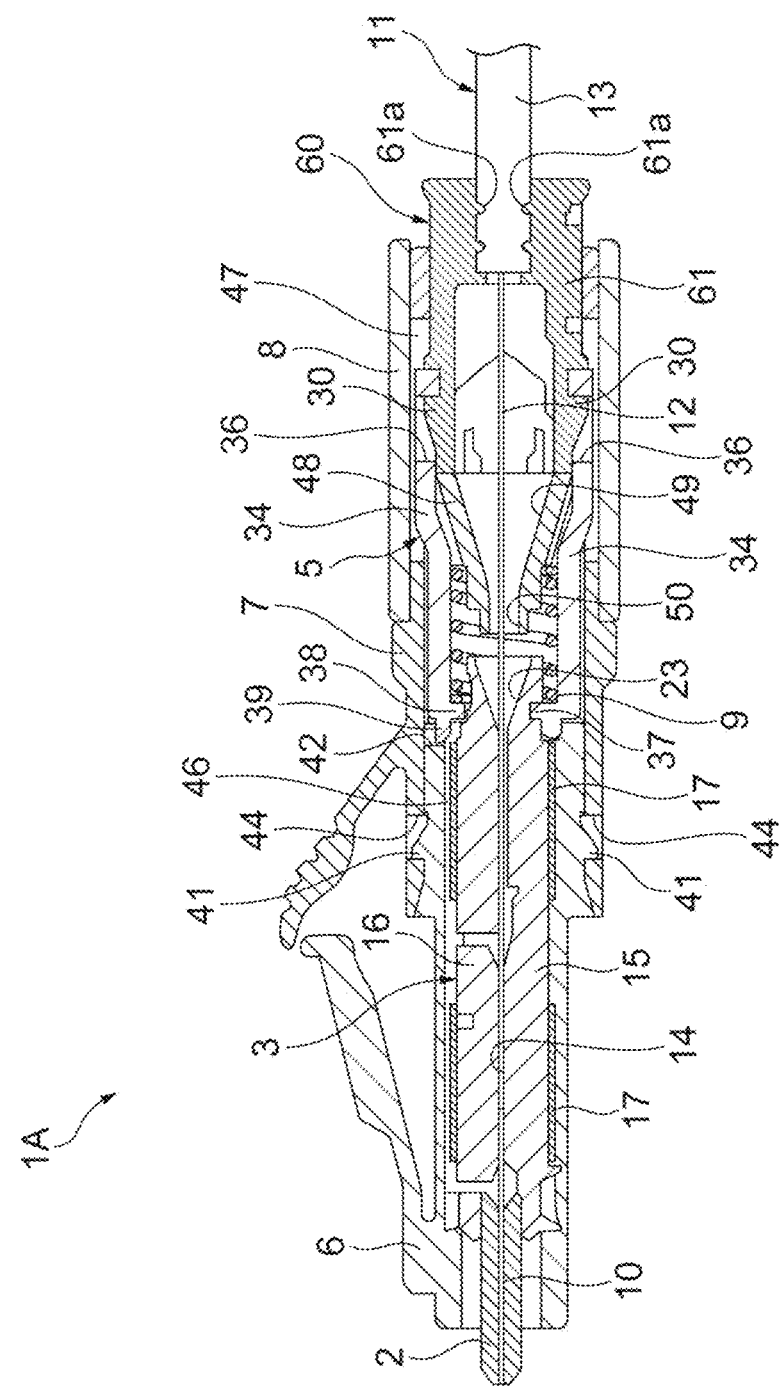
FIG. 7 is a sectional view illustrating a modification of the optical connector shown in FIG. 2.

A modification of the optical connector 1 will be described with reference to FIG. 7. FIG. 7 is a sectional view illustrating a modification of the optical connector shown in FIG. 2. In FIG. 7, like the optical connector 1, an optical connector 1A according to the present modification comprises the ferrule 2, the mechanical splice 3, the joint member 5, the plug housing 6, the rear body 7, the cover housing 8, and the coil spring 9. On the other hand, the optical connector 1A of the present modification is equipped with an optical fiber holder 60 instead of the optical fiber holder 4. The optical fiber holder 60 is a dedicated cable holder for fixing the optical cable 11 in position.

Figure 8A:
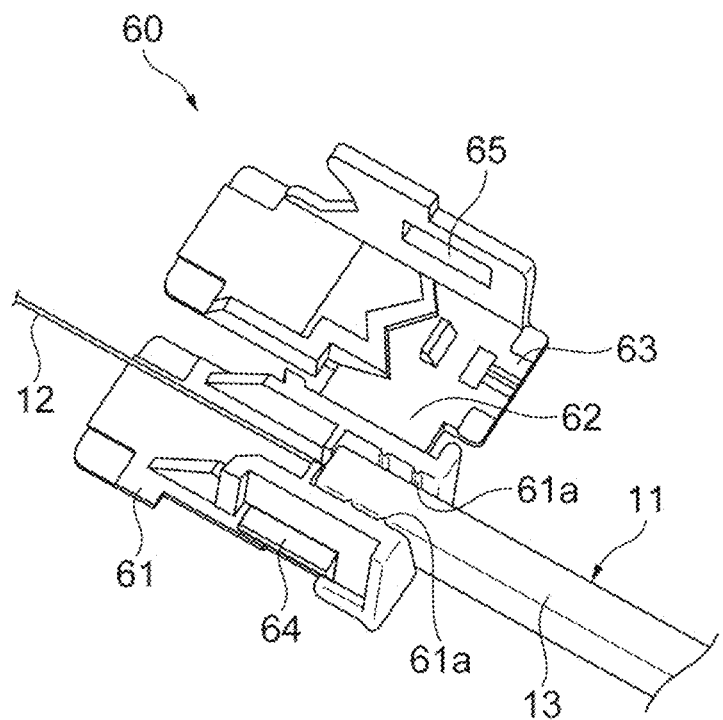
FIG. 8A is a perspective view illustrating a state in which the optical fiber holder shown in FIG. 7 is opened.
Figure 8B:
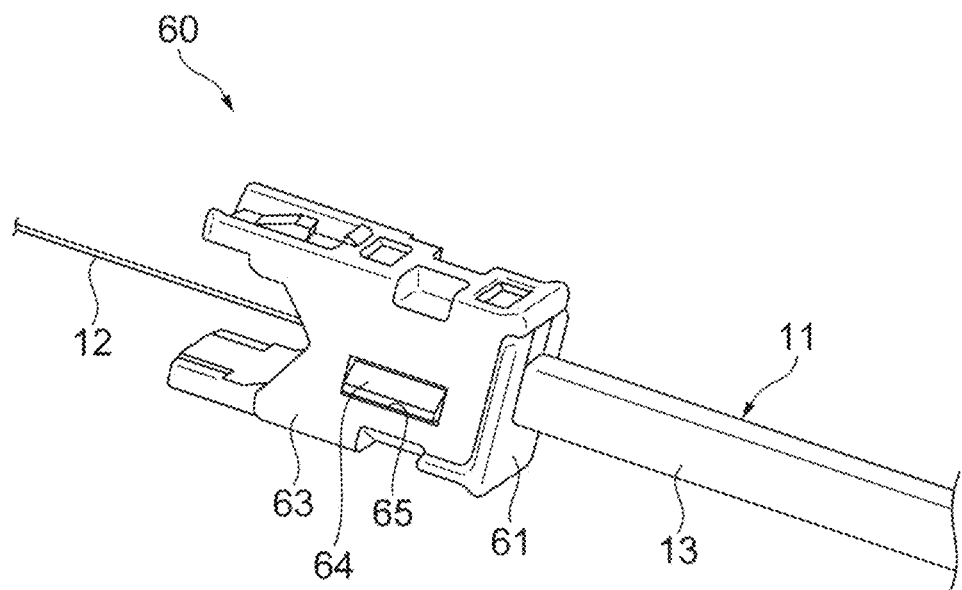
FIG. 8B is a perspective view illustrating a state in which the optical fiber holder shown in FIG. 7 is closed.

As shown in FIGS. 8A and 8B, the optical fiber holder 60 includes a base 61 having a plurality of edges 61a (rasp-cutters) engaged in the cable jacket 13 of the optical cable 11, and a cover 63 formed integrally via the base 61 and a hinge 62. The base 61 is provided with a protrusion 64 for locking. The cover 63 is provided with an opening 65 for locking engaged with the protrusion 64. The protrusion 64 is caught by the opening 65, whereby the cover 63 is locked to the base 61. The cover 63 may be provided with the protrusion for locking, and the base 61 may be provided with the opening for locking.

The present invention is not restricted to the embodiment and modification described above. For example, while in the above embodiment the coil spring 9 is arranged inside the joint member 5, this should not be construed restrictively. The coil spring 9 may be arranged outside the joint member 5. In this case, it is possible to diminish the wall thickness of the joint member 5, so that it is possible to achieve a reduction in the size of the optical connector 1.

While in the above embodiment the recess 19 for connection is provided on the base member 15 of the mechanical splice 3, this should not be construed restrictively. The recess 19 for connection may be provided on the pressing member 16 of the mechanical splice 3.

While in the above embodiment the recess 19 is provided at the rear portion of the mechanical splice 3, and the protrusion 37 to be fit-engaged with the recess 19 is provided at the front end portion of one arm 34 of the joint member 5, this should not be construed restrictively. For example, it is only necessary for the joint member 5 and the mechanical splice 3 to be provided with a stopper portion preventing the joint member 5 from moving in the longitudinal direction (front-rear direction) with respect to the mechanical splice 3. In this case, by fitting the plug housing 6 and the rear body 7 onto the mechanical splice 3, it is possible to prevent the joint member 5 from rising, so that there is no fear of the joint member 5 being detached from the mechanical splice 3 after the assembly of the optical connector 1.

While in the above embodiment an LC connector is described as the optical connector 1 by way of example, this should not be construed restrictively. The present invention is also applicable to other types of optical connectors.

REFERENCE SIGNS LIST 1, 1A . . . optical connector, 2 . . . ferrule, 3 . . . mechanical splice, 4 . . . optical fiber holder, 5 . . . joint member, 6 . . . plug housing, 7 . . . rear body, 9 . . . coil spring, 10 . . . shorter fiber, 12 . . . optical fiber, 14 . . . fiber groove, 15 . . . base member, 16 . . . pressing member, 19 . . . recess, 34 . . . arm, 35 . . . retaining portion, 37 . . . protrusion, 39 . . . protrusion, 42 . . . cutout, 48 . . . guide wall, 49 . . . inner wall surface.

The invention claimed is:
1. An optical connector comprising:
a ferrule internally containing a shorter fiber;
a mechanical splice arranged at the rear of the ferrule, integrated with the ferrule, and mechanically connecting an optical fiber to the shorter fiber;
an optical fiber holder arranged at the rear of the mechanical splice and fixing the optical fiber in position;
a joint member connecting the mechanical splice to the fiber holder;
a housing accommodating the ferrule and the mechanical splice therein;

a rear body connected to the housing such that the rear body is arranged at the rear of the housing, the rear body accommodating at least a part of the optical fiber holder therein; and a coil spring arranged inside at least one of the housing and the rear body, the coil spring urging the mechanical splice toward a front, wherein the joint member is arranged inside at least one of the housing and the rear body;

wherein the rear body has a guide wall to guide the optical fiber into the mechanical splice, and the guide wall is arranged between the mechanical splice and the optical fiber holder, and has a tapered inner wall surface expanding from the mechanical splice toward the optical fiber holder;

wherein the guide wall is arranged on the inside of the joint member;

wherein the guide wall is arranged such that the guide wall is spaced away from the rear end of the mechanical splice; and wherein the coil spring is arranged on the inside of the joint member.

2. The optical connector according to claim 1, wherein the mechanical splice includes a base member having a fiber groove setting the optical fiber and the shorter fiber in position, and a pressing member pressing the optical fiber and the shorter fiber against the base member;

wherein the base member is integrated with the ferrule; and wherein a recess or a protrusion for connection with the joint member is provided at the rear portion of the base member.

3. The optical connector according to claim 1, wherein the guide wall has an inner wall surface of a fixed inner diameter close to the mechanical splice.

4. The optical connector according to claim 1, wherein a recess or a protrusion is provided at a rear portion of the mechanical splice; and wherein at a front portion of the joint member, there is provided a protrusion fit-engaged with the recess of the mechanical splice, or a recess fit-engaged with the protrusion of the mechanical splice.

5. The optical connector according to claim 1, wherein the joint member has a pair of arms connected to the optical fiber holder, and a retaining portion provided so as to connect the pair of arms to each other and retaining the mechanical splice by pinching the mechanical splice.

6. The optical connector according to claim 5, wherein a protrusion or a recess is provided at the front end portion of one of the pair of arms.

7. The optical connector according to claim 5, wherein a cutout or a protrusion is provided at the rear end portion of the housing; and wherein at the front end portion of the other of the pair of arms, there is provided a protrusion engaged with the cutout or a cutout engaged with the protrusion of the housing.

8. The optical connector according to claim 5, wherein an opening or a protrusion is provided at the rear portion of the pair of arms; and the pair of arms are connected to the optical fiber holder by the opening or the protrusion.

9. The optical connector according to claim 5, wherein the retaining portion is engaged with a retaining groove provided at the rear portion of the mechanical splice, whereby the joint member is connected to the mechanical splice.

10. The optical connector according to claim 5, wherein the retaining portion is C-shaped.

11. An optical connector comprising:

a ferrule internally containing a shorter fiber;

a mechanical splice arranged at the rear of the ferrule, integrated with the ferrule, and mechanically connecting an optical fiber to the shorter fiber;

an optical fiber holder arranged at the rear of the mechanical splice and fixing the optical fiber in position;

a joint member connecting the mechanical splice to the fiber holder;

a housing accommodating the ferrule and the mechanical splice therein;

a rear body connected to the housing such that the rear body is arranged at the rear of the housing, the rear body accommodating at least a part of the optical fiber holder therein; and a coil spring arranged inside at least one of the housing and the rear body, the coil spring urging the mechanical splice toward a front, wherein the joint member is arranged inside at least one of the housing and the rear body;

wherein the rear body has a guide wall to guide the optical fiber into the mechanical splice, and the guide wall is arranged between the mechanical splice and the optical fiber holder, and has a tapered inner wall surface expanding from the mechanical splice toward the optical fiber holder;

wherein the joint member has a pair of arms connected to the optical fiber holder, and a retaining portion provided so as to connect the pair of arms to each other and retaining the mechanical splice by pinching the mechanical splice;

wherein each of the pair of arms has a first plate, a second plate located closer to the optical fiber holder than the first plate, and an inclined portion located between the first plate and the second plate; and wherein the inclined portion has a shape inclined outwards toward the optical fiber holder, and the distance between the second plates is larger than the distance between the first plates.

12. The optical connector according to claim 11, wherein the joint member is set in position such that at least one of the inclined portion and the second plate is located outside of the tapered inner wall surface of the guide wall.

* * * * *